Dec. 6, 1955　　　L. C. LIBERATORE　　　2,725,748
COMPOSITE THERMOMETER
Filed March 4, 1953
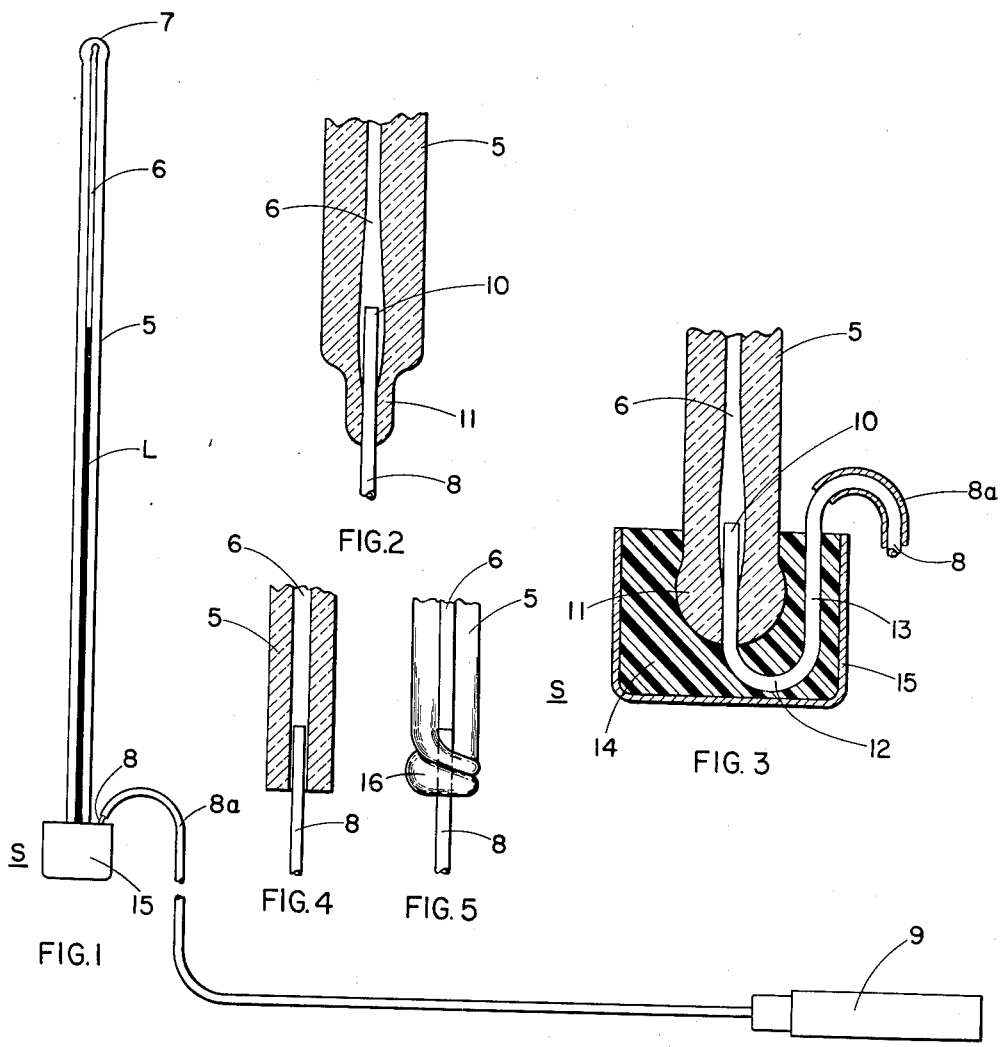
INVENTOR.
LAURENCE C. LIBERATORE
BY D Clyde Jones
ATTORNEY

United States Patent Office 2,725,748
Patented Dec. 6, 1955

2,725,748
COMPOSITE THERMOMETER

Laurence C. Liberatore, Rochester, N. Y., assignor to Taylor Instrument Companies, Rochester, N. Y., a corporation of New York Application March 4, 1953, Serial No. 340,295

2 Claims. (Cl. 73—371)

This invention relates to a composite thermometer.

The thermometer of the present invention comprises a metal bulb communicating through a metal capillary tube, with the lower end of the bore of a transparent capillary stem of glass, plastic, or the like, to serve as the indicating portion of the thermometer. The upper end of the bore in the stem is sealed closed and the joint between the metal capillary tube and the stem is also sealed so the thermosensitive indicating liquid in the thermometer does not leak out.

The main feature of the invention relates to a composite thermometer of such construction that it provides an inexpensive and reliable seal at the joint between the transparent stem and the metal capillary tube thereof.

The various features and advantages of the invention will appear from the detailed description and claims when taken with the drawings in which:

Fig. 1 is a side elevation of the composite thermometer of this invention;

Fig. 2 is a fragmentary sectional view of the press and of a portion of the flexible capillary tube comprising a part of the joint between these parts;

Fig. 3 is a fragmentary vertical sectional view of the joint between the transparent stem and the metal capillary tube, taken at right angles to the press as shown in Fig. 2;

Fig. 4 is a fragmentary view partially in section showing the capillary tube of the present thermometer inserted in the lower end of a stem having a bore of uniform diameter throughout its length; and Fig. 5 is a front view of a fragment of a thermometer in accordance with the present invention showing a modified junction between the capillary tube and the stem.

In the drawings, the numeral 5 designates a transparent graduated stem of glass, plastic, or the like having a lengthwise capillary bore 6 therethrough. The upper end of this bore is sealed closed as at 7 while the lower end of this bore communicates through a sealed joint S with one end of a flexible capillary tube 8 of a metal such as copper, for example. The other end of tube 8 which may be provided with protective covering 8a (Fig. 3), communicates with a sealed metal bulb 9. The bulb, the metal tube 8 and a portion of the stem 5 contain a thermosensitive indicating liquid L.

The sealed joint S (best illustrated in Fig. 3), is made by inserting the free end 10 of the metal capillary tube 8 into the lower end portion of the bore 6, of the stem, which portion has previously been expanded by heating and blowing. The lower end of the stem with capillary tube therein, is heated to render this end plastic. While the mentioned end of the stem is still plastic, it is squeezed or pressed at 11 into intimate contact with the inserted end 10 of the metal capillary tube (Fig. 2). The capillary tube is then bent back on itself as at 12 with the adjacent portion 13 of the tube extending along the side of the press 11 (Fig. 3).

The press 11 of the stem and the portion 13 of the metal tube are then embedded in a mass 14 of adhesive plastic material which bonds to both the stem and to the metal tube. Preferably the press and the bent back portion 12 of the tube are inserted in a thimble 15 of such depth that when the thimble is filled with the plastic material, the press 11 and the portion 12 are embedded therein to the depth indicated in Fig. 3.

Instead of expanding the lower portion of the bore 6 as shown in Figs. 2 and 3, a glass stem is made with a bore 6 (Fig. 4) of such diameter that it will just receive the free end of the metal tube 8. It has been found practical to make the stem with a bore of a diameter of 0.044" to 0.050" while the outside diameter of the capillary is of the order of 0.038" to 0.042". This capillary tube is shown inserted in the bore of its related stem as in Fig. 4.

After the free end of the tube has been inserted into the lower end portion of the stem, this portion of the stem is compressed into intimate contact with the tube. This may be effected by heating the overlapping parts and by the formation of a press 11 (Figs. 2 and 3) at the junction of these parts. However, these parts can be conveniently brought into intimate contact, as shown in Fig. 5, by heating the lower end of the stem until it becomes plastic and sticks to the tube. The stem is then rotated to wrap the plastic portion thereof around the capillary tube as shown at 16 (Fig. 5). Thereafter the thermometer is finished by embedding the junction in plastic material in the manner shown in Fig. 3.

The capillary tube is preferably made of copper, steel, stainless steel, aluminum or other so-called light metals. The mass 14 of plastic may comprise ethoxylene bonding and casting resins or materials of like characteristics.

What I claim is:

1. A thermometer comprising a closed metal bulb, a flexible metallic capillary tube communicating at one end in sealed relation with the interior of the bulb, a rigid transparent stem provided with a capillary bore closed at its upper end, the other end of the tube being sealed in the lower end of the bore to form a junction, a portion of the tube adjacent said junction being bent back on itself along the lower end of the stem, a thermosensitive liquid in the bulb, the tube and a portion of the stem, and a mass of plastic material in which said junction as well as the bent back portion of the tube are embedded in sealed relation thereto.

2. A thermometer comprising a closed metal bulb, a flexible metallic capillary tube communicating at one end in sealed relation with the interior of the bulb, a rigid transparent stem provided with a capillary bore closed at its upper end, the other end of the tube being sealed in the lower end of the bore to form a junction, a portion of the tube adjacent said junction being bent back on itself along the lower end of the stem, a thermosensitive liquid in the bulb, the tube and a portion of the stem, and a thimble filled with a mass of plastic material in which said junction as well as the bent back portion of the tube are embedded in sealed relation.

References Cited in the file of this patent

UNITED STATES PATENTS

| | | |
|---|---|---|
| 1,385,661 | Boyce | July 26, 1921 |
| 1,498,747 | Papendel | June 24, 1924 |
| 1,712,653 | Egloff | May 14, 1929 |
| 1,811,190 | Tate | June 23, 1931 |

FOREIGN PATENTS

| | | |
|---|---|---|
| 521,228 | Germany | Mar. 19, 1931 |
| 504,540 | Great Britain | Apr. 26, 1939 |
| 253,988 | Switzerland | Dec. 1, 1948 |